United States Patent [19]

Nelson, III et al.

[11] Patent Number: 5,787,137
[45] Date of Patent: Jul. 28, 1998

[54] METHODS AND APPARATUS FOR PERFORMING REPAIRS AND INSPECTIONS IN A REACTOR PRESSURE VESSEL OF A NUCLEAR REACTOR

[75] Inventors: Alfred Stanley Nelson, III, San Jose; Yehuda Krampfner, Pleasanton; Jack Toshio Matsumoto, Sunnyvale; Rene Delgado, Saratoga, all of Calif.

[73] Assignee: General Electric Company, Schenectady, N.Y.

[21] Appl. No.: 595,640

[22] Filed: Feb. 2, 1996

[51] Int. Cl.[6] ................................................ G21C 17/01
[52] U.S. Cl. .............................. 376/249; 376/260; 414/8; 414/618
[58] Field of Search ........................ 376/249, 260, 376/261, 262, 268, 271; 414/8, 618; 294/86.13

[56] References Cited

U.S. PATENT DOCUMENTS

| | | | |
|---|---|---|---|
| 3,253,995 | 5/1966 | Antonsen et al. | 376/271 |
| 4,330,369 | 5/1982 | Anderson | 376/268 |
| 4,585,610 | 4/1986 | Andersson et al. | 376/249 |
| 4,822,238 | 4/1989 | Kwech | 414/8 |
| 5,156,803 | 10/1992 | Engding et al. | 376/249 |
| 5,521,950 | 5/1996 | Whitling | 376/260 |

*Primary Examiner*—Daniel D. Wasil
*Attorney, Agent, or Firm*—Armstrong, Teasdale, Schlafly & Davis

[57] ABSTRACT

Methods and apparatus for performing repairs and inspections in a reactor pressure vessel (RPV) of a nuclear reactor are described. In one embodiment of the apparatus, a support mast facilitates the positioning of tools within the RPV, especially at locations that are extremely difficult to access using known methods and apparatus. In the one embodiment, a mast extends in the reactor pressure vessel and through an opening in the top guide and through an opening in the core plate. The mast includes an outer tube and an inner tube positioned at least partially within the outer tube. The inner tube is connected to a robotic arm. A slot is formed in the outer tube and the slot extends at least partially along the axial length of the mast. The portion of the inner tube positioned at the location of the slot is in free communication with the reactor components when the mast is positioned within the RPV. The robotic arm can access the reactor components through the slot in the outer tube.

12 Claims, 5 Drawing Sheets

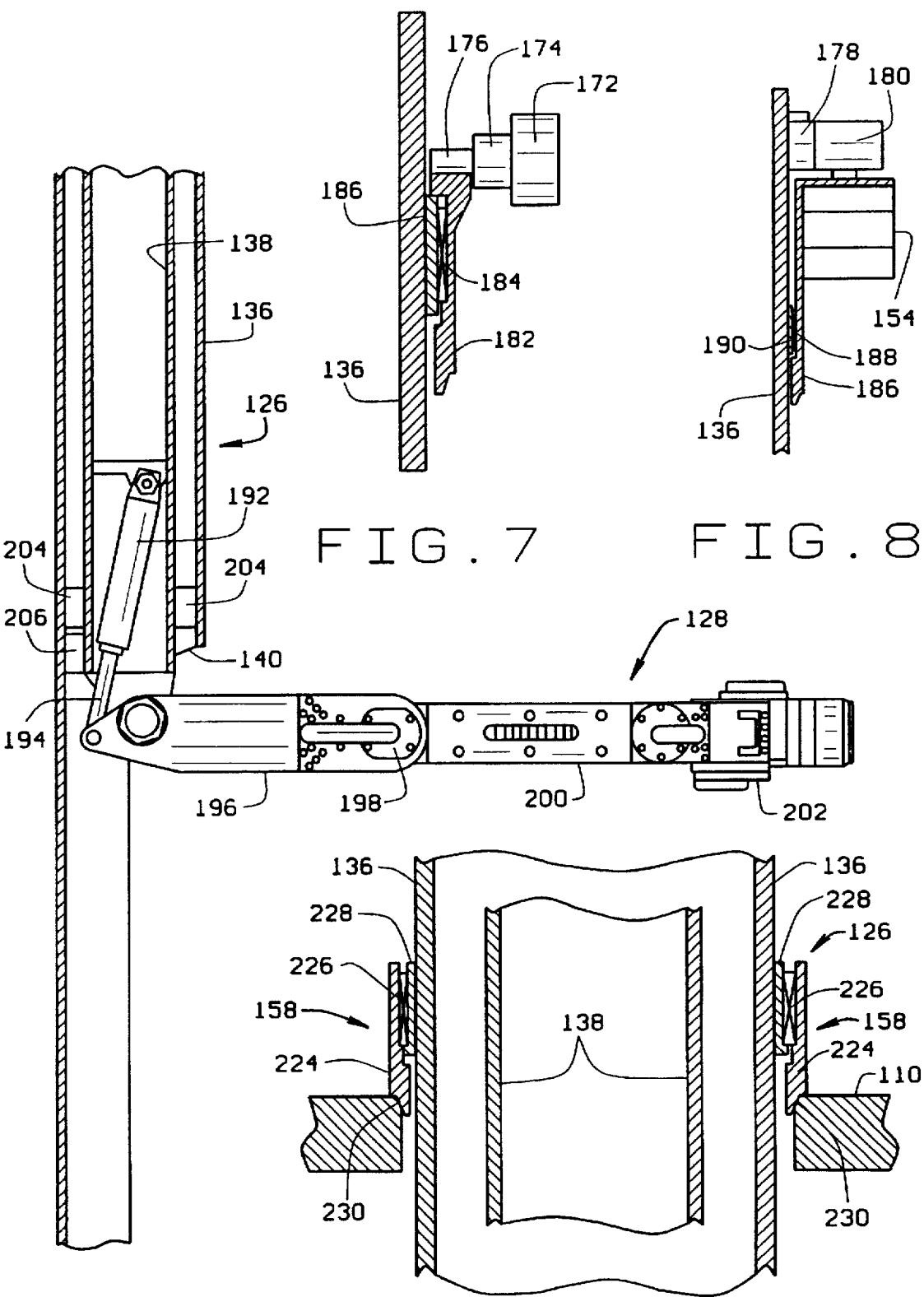

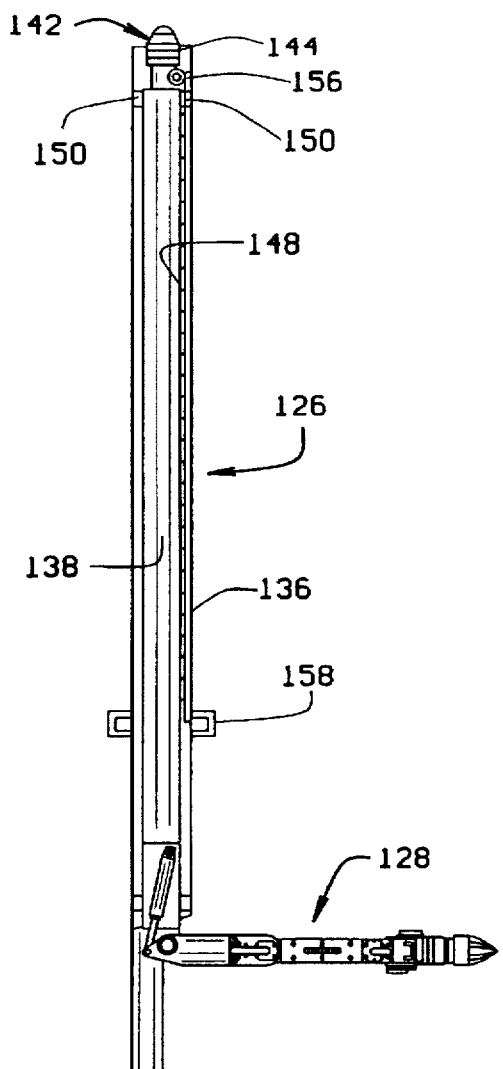
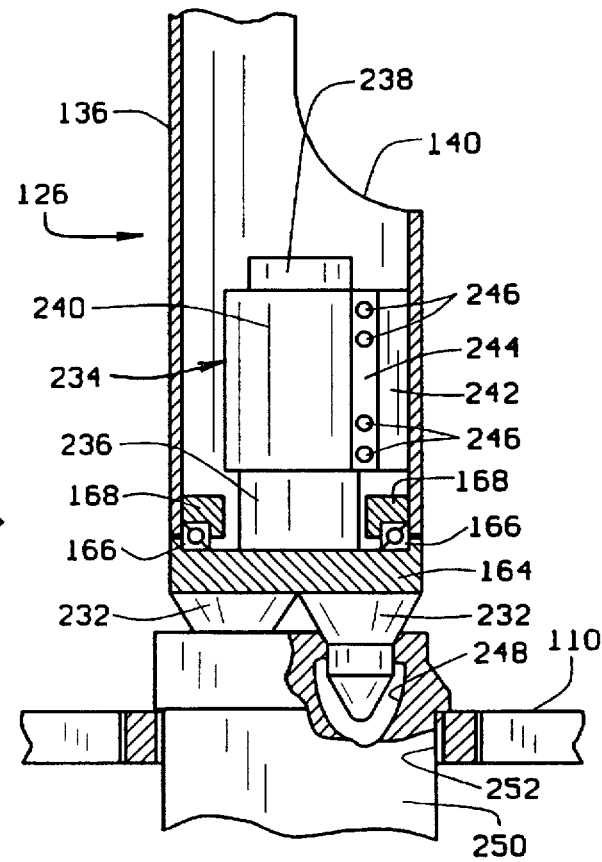
FIG. 14
FIG. 13

METHODS AND APPARATUS FOR PERFORMING REPAIRS AND INSPECTIONS IN A REACTOR PRESSURE VESSEL OF A NUCLEAR REACTOR

FIELD OF THE INVENTION

This invention relates generally to performing repairs and inspections in nuclear reactors and, more particularly, to methods and apparatus for enabling easy access to locations within the nuclear reactor pressure vessel.

BACKGROUND OF THE INVENTION

Repairs and inspections performed within the reactor pressure vessel (RPV) of a boiling water reactor (BWR) typically are performed with ropes and poles for manual manipulation of simple tools or manual delivery of dedicated automated tools. More specifically, the RPV typically has a generally cylindrical shape and is closed at both ends, e.g., by a bottom head and a removable top head. A top guide typically is spaced above a core plate within the RPV. Many other components, e.g., steam dryers, also are located in the RPV.

During reactor shut down, and if it is desired to inspect or repair certain components within the RPV, the RPV top head is removed. Other components such as the steam dryers may also be removed to enable access to RPV locations between the top guide and core plate or locations below the core plate. To perform the inspections and repairs, an operator typically on a bridge positioned over the RPV and using ropes and poles, which may extend more than thirty (30) feet below the bridge into the RPV, inspect or repair certain RPV components. The ability to perform such inspections and repairs greatly depends on the dexterity of the operator.

In addition, it is extremely difficult to precisely position a tool within the RPV, especially below the core plate, using ropes and poles. Even if the tool is accurately positioned for one operation in a desired location, it is extremely difficult to then precisely position another tool at the exact same location to perform a next step in the operation. Also, each inspection and repair operation typically requires the design and fabrication of special, dedicated tools. Designing and fabricating tools for each task is costly.

Due to the difficulty in even accessing certain locations within the RPV, performing repairs and inspections at such locations can be time consuming. It is desirable, of course, to limit the time required to perform repairs and inspections in the RPV since the reactor must be shut down to perform such tasks. Reducing the amount of time required to perform such inspections and repairs also would facilitates reducing the operator radiation exposure per task.

SUMMARY OF THE INVENTION

These and other objects are attained by methods and apparatus for performing repairs and inspections in an RPV which, in one embodiment of the apparatus, includes the use of a support mast to facilitate the positioning of tools within the RPV, especially at locations that are extremely difficult to access using known methods and apparatus. In one embodiment of the apparatus, a mast extends in a reactor pressure vessel and through an opening in the top guide and through an opening in the core plate. The mast includes an outer cylindrical shaped tube and an inner tube positioned at least partially within the outer tube. The inner tube has a substantially square cross sectional shape and is connected to a robotic arm.

A slot is formed in the outer tube and the slot extends at least partially along the axial length of the mast. The portion of the inner tube positioned at the location of the slot is in free communication with the reactor components when the mast is positioned within the RPV. In one embodiment, a robotic arm is mounted to the inner tube and can access the reactor components through the slot in the outer tube.

The inner tube and robotic arm are vertically movable relative to the outer tube. Specifically, a vertical drive assembly is secured to the inner tube and the vertical drive assembly includes a vertical drive motor and a pinion. Rotation of the pinion is controlled by the vertical drive motor. An elongate rack is secured to and extends longitudinally along a length of an inner surface of the outer tube. The rack is aligned with the pinion so that as the pinion rotates, the inner tube moves vertically relative to the outer tube. A sliding guide is secured to the inner tube and extends from the inner tube to the inner surface of the outer tube. The sliding guide facilitates maintaining the inner tube coaxially aligned with the outer tube, particularly as the inner tube moves vertically relative to the outer tube.

A fixturing component interface is secured to a bottom end of the mast. The interface includes a substantially stationary plate member and thrust bearings are secured to an upper surface of the plate member. The mast has alignment arms that are configured to mate with the thrust bearings so that the mast is rotatable relative to the plate member. Rotating the mast enables the robotic arm to easily reach additional locations within the RPV.

By using the above described apparatus, a tool can be precisely positioned within the RPV, even at locations below the core plate. In addition, the tool can be precisely positioned with greater certainty and high repeatability. Further, special dedicated tools are not necessarily required for each operation since the robotic arm can reach a variety of locations to perform a wide variety of inspections and repairs within the RPV. The subject apparatus also facilitates reducing the time required to perform inspections and repairs, which facilitates reducing the operator radiation exposure per task.

BRIEF DESCRIPTION OF THE DRAWINGS

FIG. 7 is a more detailed view the clamp and actuator assembly shown in FIG. 6.

FIG. 8 is a cross section view through line B—B shown in FIG. 5.

FIG. 9 is a more detailed view of the manipulator attached to the mast shown in FIG. 1.

FIG. 11 is a detailed view of the core plate interface of the mast shown in FIG. 2.

FIG. 13 illustrates an alternative configuration of the mast shown in FIG. 2 with a bottom end fixturing to accommodate a fuel casting in the core plate.

FIG. 14 is a more detailed partial cross section view of the rotary actuator in the mast shown in FIG. 13.

DETAILED DESCRIPTION OF THE DRAWINGS

Figures 1, 2:
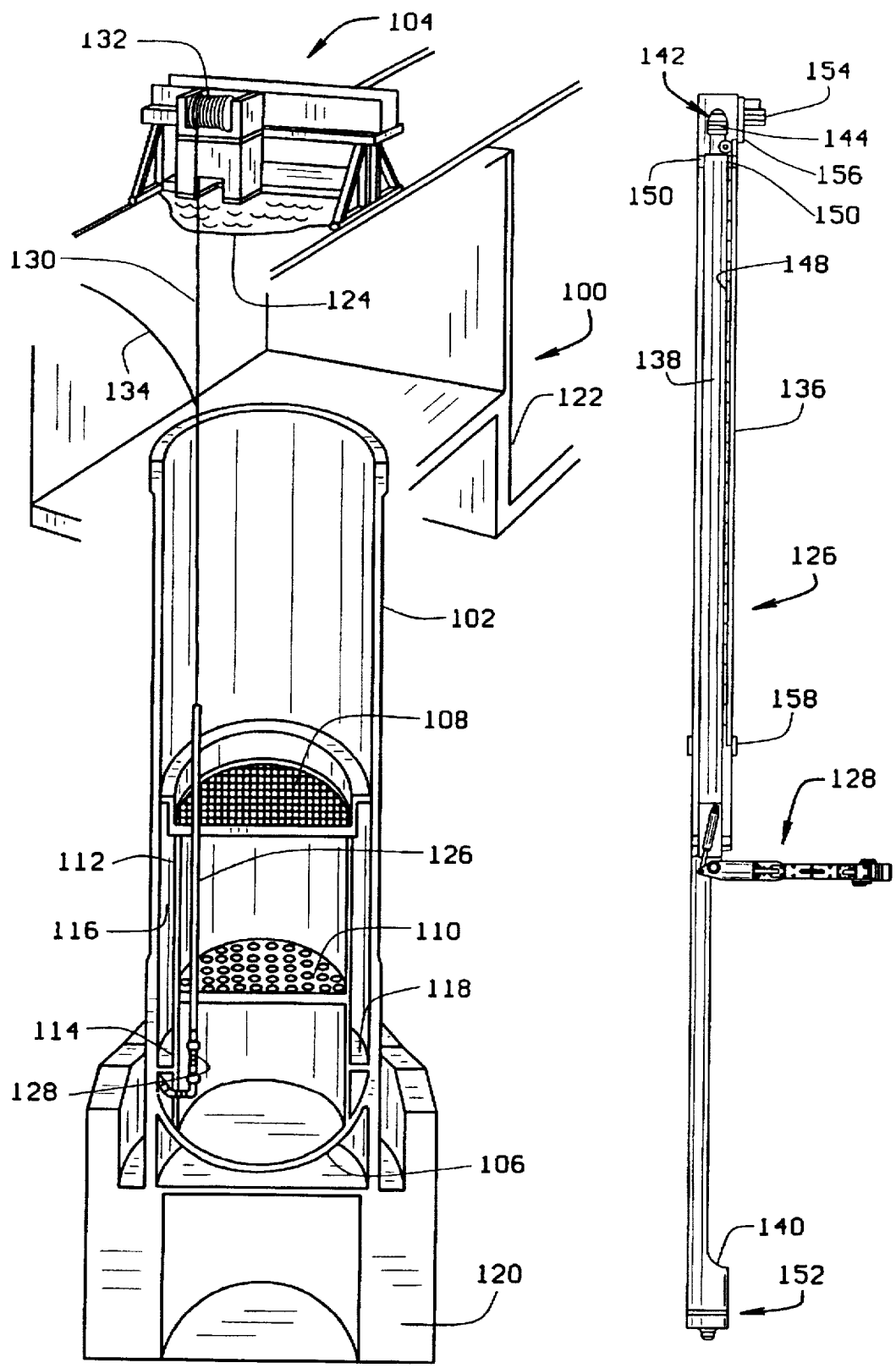
FIG. 1 is a schematic, partial cross section, illustration of a reactor pressure vessel and a refueling bridge of a boiling water reactor.
FIG. 2 is a partial cross section illustration of a mast in accordance with one embodiment of the present invention.

FIG. 1 is a schematic, partial cross section, illustration of a boiling water reactor 100 including a reactor pressure vessel (RPV) 102 and a bridge 104. RPV 102 has a generally cylindrical shape and is closed at one end by a bottom head 106 and at its other end by removable top head (not shown). A top guide 108 is spaced above a core plate 110 within RPV 102. A shroud 112 surrounds core plate 110 and is supported by a shroud support structure 114. An annulus 116 is formed between shroud 112 and the wall of RPV 102. A baffle plate 118, which has a ring shape, extends around RPV 102 between shroud support structure 114 and the wall of RPV 102.

RPV 102 is supported by an RPV support structure 120 and RPV 102 extends into an upper containment 122. Upper containment 122 and RPV 102 are, of course, filled with water. A water level 124 is shown as being just below bridge 104.

RPV 102 is shown in FIG. 1 as being shut down with many components removed. For example, and in operation, many fuel bundles (not shown) are located in the area between top guide 108 and core plate 110. In addition, and in operation, steam dryers and many other components (not shown) are located in the area above top guide 108.

It should be understood that the present invention is not limited to practice in reactor 100 and the present invention could be used in many different reactors having many different alternative configurations. Reactor 100 is illustrated by way of example only and not by way of limitation.

As shown in FIG. 1, a mast 126 configured in accordance with one embodiment of the present invention extends through an opening in top guide 108 and an opening in core plate 110. A manipulator, or robotic, arm 128 is shown as extending from mast 126 and manipulator arm 128 is positioned to perform an operation, e.g., an inspection, with respect to baffle plate 118.

Mast 126 is lowered into the position shown in FIG. 1 by using a cable 130 and a winch 132 mounted to bridge 104. The positioning of mast 126 within RPV 102 is described hereinafter in more detail. Control and air cables 134 are bundled and extend from an operator control station (not shown), typically located on the refueling floor (not shown). The operator controls positioning of mast 126 and manipulator arm 128 using such station as described hereinafter in more detail.

FIG. 2 is a partial cross section illustration of mast 126. Mast 126 includes an outer cylindrical shaped tube 136 and an inner tube 138 positioned at least partially within outer tube 136. Inner tube 138 has a substantially square cross sectional shape and is connected to manipulator arm, or robotic arm, 128. Inner tube 138 could, of course, have many cross-sectional shapes other than square.

A slot 140 is formed in outer tube 136 and slot 140 extends at least partially along the axial length of mast 126. The portion of inner tube 138 positioned at the location of slot 140 is substantially in free communication with RPV 102 (FIG. 1) when mast 126 is positioned within RPV 102.

Inner tube 138 and robotic arm 128 are vertically movable relative to outer tube 136. Specifically, a vertical drive assembly 142 is secured to inner tube 138 and vertical drive assembly 142 includes a vertical drive motor 144 and a pinion 146. Rotation of pinion 146 is controlled by vertical drive motor 144. An elongate rack 148 is secured to and extends longitudinally along a length of an inner surface of outer tube 136. Rack 148 is aligned with pinion 146 so that as pinion 146 rotates, inner tube 138 moves vertically relative to outer tube 136.

Sliding guides 150 are secured to inner tube 138 and extend from inner tube 138 to the inner surface of outer tube 136. Sliding guides 150 facilitate maintaining inner tube 138 coaxially aligned with outer tube 136, particularly as inner tube 138 moves vertically relative to outer tube 136.

A fixturing component interface 152 is secured to the bottom end of mast 126. Interface 152, as described hereinafter in more detail, enables rotation of mast 126 relative thereto. Rotating mast 126 enables robotic arm 128 to easily reach additional locations within RPV 102 (FIG. 1). A rotary actuator 154 drives rotation of mast 126 as described hereinafter in more detail.

A top guide interface 156 is secured to an outer surface of mast 126 and provides lateral support for mast 126 when positioned within RPV 102 as shown in FIG. 1. A core plate interface 158 also is secured to an outer surface of mast 126 and provides further lateral support for mast 126 when positioned within RPV 102 as shown in FIG. 1. Top guide interface 156 and core plate interface 158 are described hereinafter in more detail.

Outer and inner tubes 136 and 138, in one embodiment, are constructed from a corrosion resistant alloy (e.g., stainless steel). The height of tubes 136 and 138 and the location of interfaces 156 and 158, as well as the length of slot 140 and arm 128 all may vary depending on the particular reactor in which mast 126 is to be used. As one example, mast 126 may have a total height of about 338.6", and the distance from interface 152 to interface 156 may be about 328.1". In the one embodiment, the distance from interface 152 to interface 158 may be about 160.3", and robotic arm 128 can extend laterally about 49.1" from mast 126.

Figure 3:
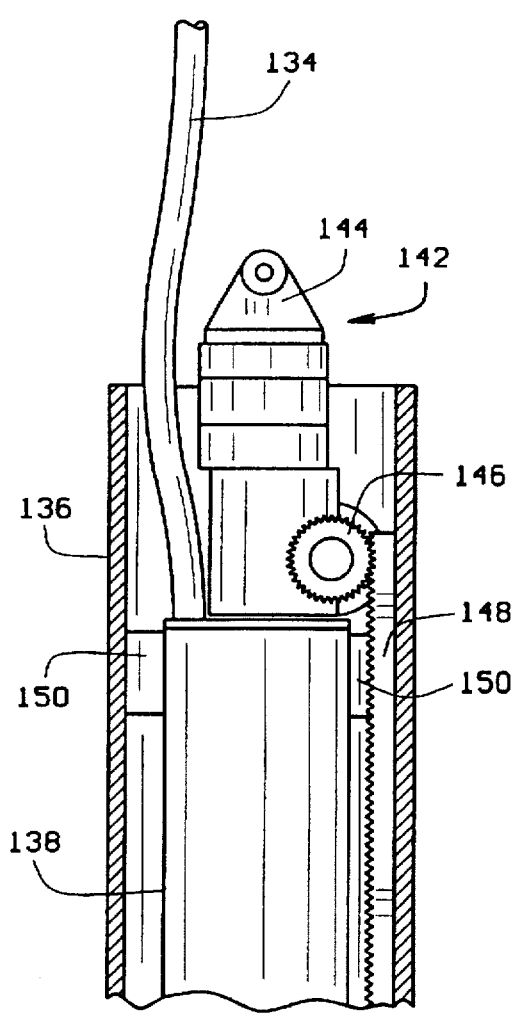
FIG. 3 is a more detailed view of the vertical drive actuator secured to the mast shown in FIG. 2.

FIG. 3 is a more detailed view of vertical drive actuator assembly 142 secured to mast 126 as shown in FIG. 2. As explained above, vertical drive assembly 142 is secured to inner tube 138 and includes vertical drive motor 144 and pinion 146. Elongate rack 148 is secured to and extends longitudinally along an inner surface of outer tube 136. Rack 148 is aligned with pinion 146 so that as pinion 146 rotates, inner tube 138 moves vertically relative to outer tube 136. Sliding guides 150 are secured to inner tube 138 and extend from inner tube 138 to the inner surface of outer tube 136. Sliding guides 150 facilitate maintaining inner tube 138 coaxially aligned with outer tube 136.

Figure 4:
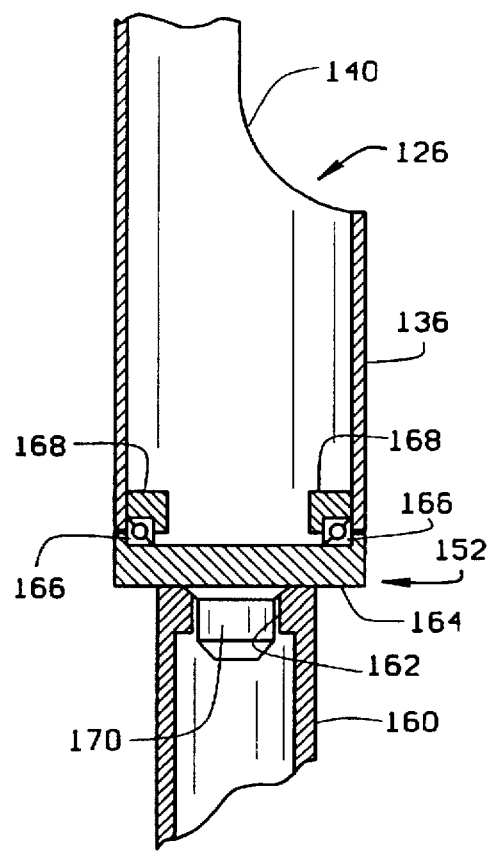
FIG. 4 is a more detailed view of the control rod drive housing interface secured to the mast shown in FIG. 2.

FIG. 4 is a more detailed view of fixturing component interface 152, which as shown, is configured to mate with a control rod drive housing 160 having an opening 162 formed therein. Interface 152 includes a substantially stationary plate member 164 and thrust bearings 166 are secured to an upper surface of plate member 164. Mast 126 has alignment arms 168 configured to mate with thrust bearings 164 so that mast 126 is rotatable relative to plate member 164. Rotating mast 126 enables robotic arm 128 (FIG. 2) to easily reach additional locations within RPV 102 (FIG. 2). An alignment pin 170 extends from plate 164 and is configured to be inserted within opening 162 of CRD housing 160. In this manner, CRD housing 160 supports mast 126.

Figure 5:
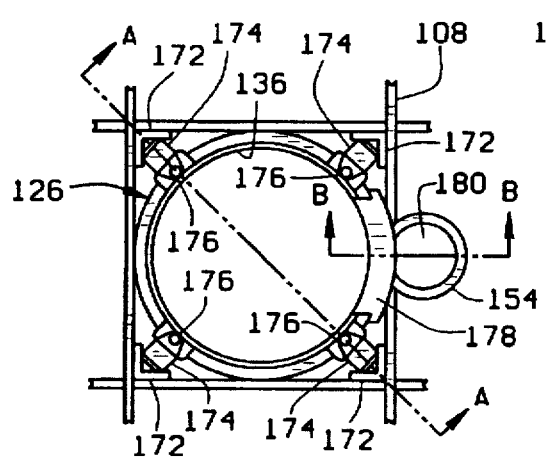
FIG. 5 is a top view of the top guide interface of the mast shown in FIG. 2.

FIG. 5 is a top view of top guide interface 156 of mast 126. As shown in FIG. 5, interface 156 includes arrowhead shaped clamps 172 which extend from mast 126 and are positioned for cooperating with top guide 108 to restrict lateral movement of mast 126. Clamps 172 are controlled by linear actuators 174 mounted to outer tube 136. When linear actuators 174 are extended, clamps 172 make firm contact with surfaces of top guide 108 and limit movement of mast 126. When linear actuators are retracted, a clearance space between clamps 172 and top guide 108 enable mast 126 to move within top guide 108.

Rotary actuator 154 and a ring gear 178 also are shown in FIG. 5. Ring gear 178 is secured to an outer portion of outer tube 136. A pinion 180 forms part of rotary actuator 154 and pinion 180 is aligned with ring gear 178 so that as pinion 180 rotates, ring gear 178 and mast 126 rotate.

Figure 6:
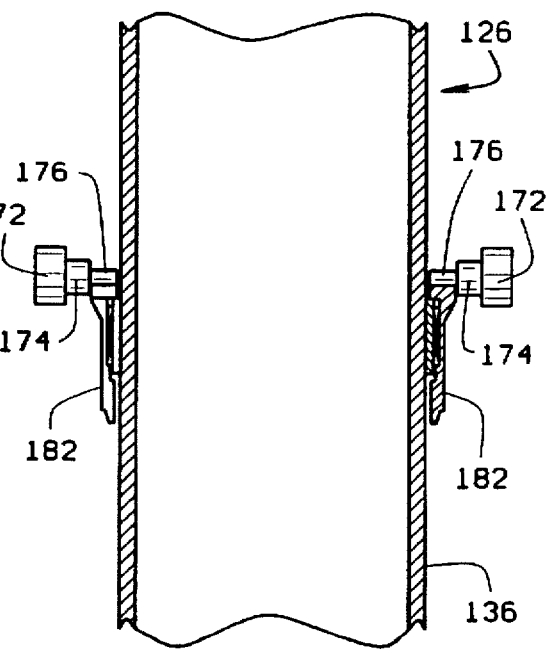
FIG. 6 is a cross section view through line A—A shown in FIG. 5.

FIG. 6 is a cross section view through line A—A shown in FIG. 5. As best shown in FIG. 6, an annular shaped spring biased wedge 182 is secured to mount 176. Wedge 182 contacts surfaces of top guide 108 (FIG. 5) and further stabilize mast 126.

FIG. 7 is a more detailed view of spring biased wedge 182. As shown in FIG. 7, a bearing 184 is secured to and extends between a base 186 and wedge 182. Bearing 184 enables outer tube 136 to rotate relative to clamps 172 (FIG. 5).

FIG. 8 is a cross section view through line B—B shown in FIG. 5 and illustrates pinion gear 180 in engagement with ring gear 178. Rotary actuator 154 is mounted to outer tube 136 by an L-shaped mount member 186 secured to a bearing assembly 188 in rotatable engagement with a base 190.

FIG. 9 is a more detailed view of manipulator arm 128 attached to mast 126 shown in FIG. 1. Referring to FIG. 9, arm 128 includes a hydraulic cylinder 192 having a shoulder joint 194 extending therefrom. An upper arm member 196 is coupled at one end to shoulder joint 194. An elbow joint 198 is coupled to the other end of upper arm member 196, and a lower arm member 200 is coupled to elbow joint 198 and is rotatable about elbow joint 198 relative to upper arm member 196. A wrist joint 202 which can accommodate a gripper (not shown) is attached to lower arm 200. Robotic arms are, of course, well known and many different configuration arms can be used in connection with mast 126. Arm 128 is illustrated by way of example only.

Also shown in FIG. 9 are stationary guide members 204 mounted to outer tube 136. Stationary guide members 204 are provided to stabilize inner tube 138. A sliding guide member 206 is connected to inner tube 138 and slides along the inner surface of outer tube 136 as inner tube 138 moves vertically relative to slot 140.

Figure 10:
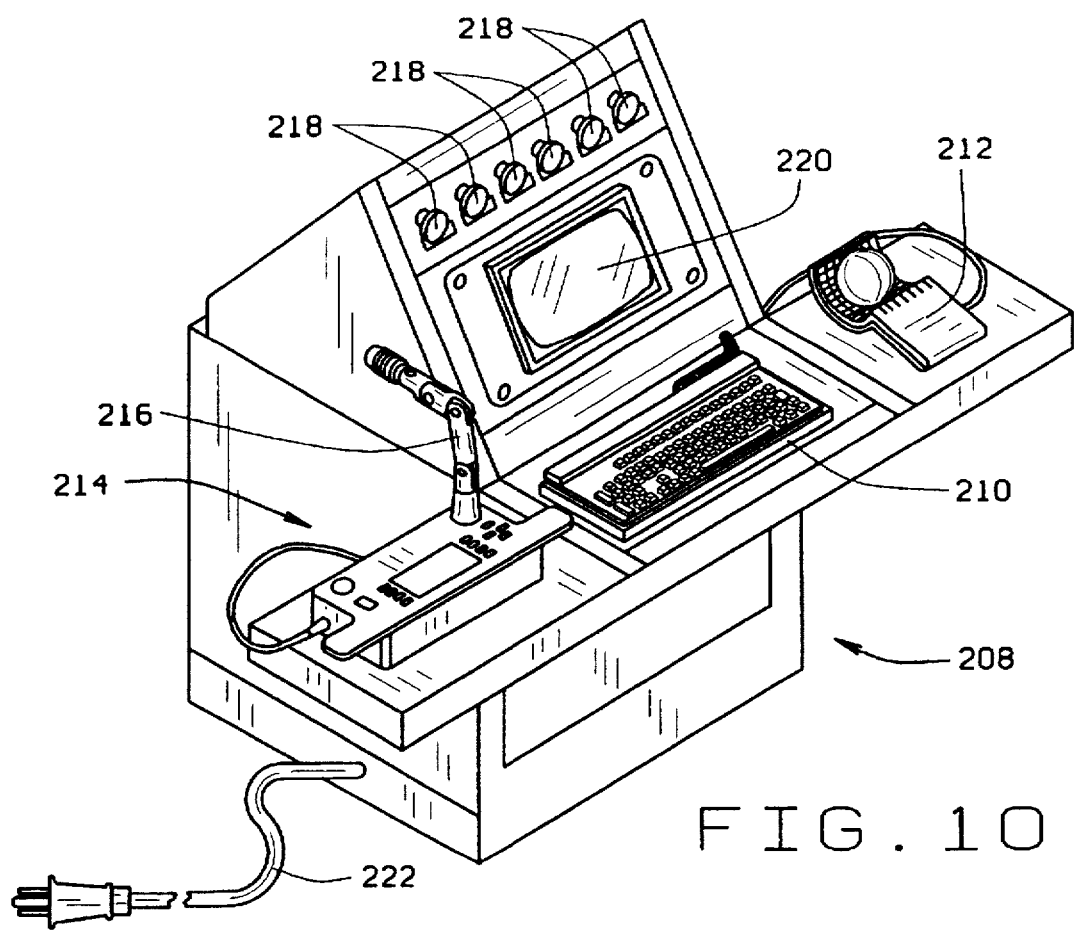
FIG. 10 is a pictorial illustration of an operator control station which may be used in connection with the mast and manipulator arm shown in FIG. 2.

FIG. 10 is a pictorial illustration of an operator control station 208 which may be used in connection with mast 126. Station 208 is a computer based work station which receives operator inputs from a keyboard 210, a ball controller 212, and a robotic arm control unit 214 having a robotic arm simulator 216 thereon. Operator inputs also may be provided via control adjustment knobs 218. Process parameters typically are shown on a display 220. Power is supplied to work station 208 via a power line 222.

Control and air cables 134 (FIG. 1) extend from mast 126 to work station 208. An operator controls, for example, engagement of top guide interface clamps 172, vertical drive motor 144, rotary actuator 154 and robotic arm 128 at work station 208. In addition, the work station computer can be programmed to store information related to the performance of certain maneuvers so that such maneuvers can be repeated automatically under the control of the computer.

Work stations 208 and robotic arms 128, adaptable for use in nuclear reactor applications, are commercially available. Examples of such work stations and robotic arms are commercially available from Schilling Development, Inc., 1632 Da Vinci Court, Davis, Calif. 95616.

Of course, all motions of mast 126 and arm 128 can be manually, semi-automatically or fully automatically performed also. During manual operation, position feedback typically would be provided by a real-time video camera located within RPV 102 (FIG. 1). Semi-automatic control is also typically accomplished by manual manipulation but such control is computer aided by pre-programmed three dimensional collision avoidance envelopes stored in and executed by work station 208. Fully automatic motion typically relies on three dimensional computer models of the work environment. The three dimensional models would be integrated into work station 208 and used by work station 208 in performing the desired task.

FIG. 11 is a detailed view of core plate interface 158 of mast 126. Interface 158 includes a wedge 224 secured to a bearing assembly 226. Bearing assembly also is rotatably attached to a mount member 228 which is secured to outer tube 136. Mast 126 therefore is rotatable relative to wedge 224. Wedge 224 forms a lip 230 which engages an upper surface of core plate 110 to facilitate limiting lateral movement of mast 126.

Figure 12:
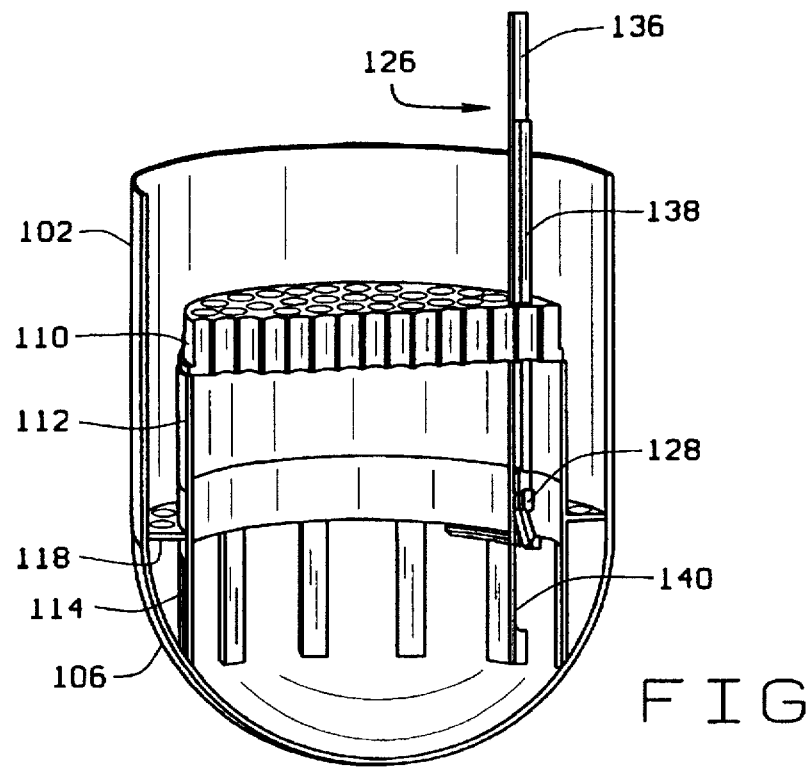
FIG. 12 is a pictorial illustration of the mast shown in FIG. 2 operatively positioned with respect to a core plate in a reactor pressure vessel.

FIG. 12 is a pictorial illustration of mast 126 operatively positioned with respect to core plate 110 in RPV 102. Mast 126 extends through an opening in core plate 110 and robotic arm is shown performing an operation in the region below core plate 110. The core plate opening is the opening in which the fuel casting support typically is located during reactor operation. Mast 126 is supported on a control rod drive housing (not shown in FIG. 12).

From FIG. 12 it can be easily seen that robotic arm 128 can move about relatively easily below core plate 110 at many different elevations and angular orientations. In addition, arm 128 can be precisely positioned with a high degree of certainty and repeatability. Further, special dedicated tools are not necessarily required for each operation since robotic arm 128 can reach a variety of locations to perform a wide variety of inspections and repairs within RPV 102. Mast 126 also facilitates reducing the time required to perform inspections and repairs, which facilitates reducing the operator radiation exposure per task.

Of course, mast 126 can be supported at many different elevations within RPV 102. In FIG. 12, mast 126 is positioned so that arm 128 can perform work below core plate 110. Work can also be performed, however, above core plate 110 in regions both below and above top guide 108. To perform work at such alternative elevations, the lower support structure for mast 126 must be adapted to mate with an available support structure.

For example, and referring to FIG. 13, fixturing component interface 152 is adapted to mate with a fuel support casting (not shown in FIG. 13 but shown and described in connection with FIG. 14). Components shown in FIG. 13 that are identical to components shown in FIG. 2 are indicated in FIG. 13 using the same reference numerals as used in FIG. 2. The difference between the FIG. 2 embodiment and the FIG. 13 embodiment is that in FIG. 13, fixturing component interface 152 mates with a fuel support casting whereas the in FIG. 2, fixturing component interface 152 mates with a control rod drive housing. Referring specifically to FIG. 13, interface 152 includes core plate interface prongs 232. A rotor assembly 234 is positioned in lower portion of mast 126 for enabling the rotation of mast 126 relative to the fuel support casting.

As shown in FIG. 14, which is a more detailed partial cross section view of the lower portion of mast 126 shown in FIG. 13, rotor assembly 234 includes a rotary actuator motor 236 having a rotor 238 extending therefrom. Motor 236 is mounted on mast support plate 164. A cylindrical rotor housing 240 is positioned over motor 236 and rotor 238 extends through housing 240. A mast attachment block 242 is connected to cylindrical housing 240 using a brace 244 and four bolts 246. Also, core plate interface prongs 232 are aligned with and inserted into openings 248 in fuel support casting 250. Fuel support casting 250 is positioned within an opening 252 in core plate 110.

In operation, as rotor 238 rotates, cylindrical housing 240 rotates with rotor 238. Such rotation is transferred to mast 126 through block 242. Thrust bearings 168 enable mast 126 to rotate while plate 164 remains stationary. There are, of course, many other configurations that could be used to achieve such rotation and for providing support for mast 126 within RPV 102.

Mast 126 also can be supported to perform work in annulus 116 (FIG. 1) of RPV 102. For example, mast 126 could be supported by jet pump diffusers (not shown) positioned in annulus 116. Additional lateral support could be provided, for example, by an outrigger extending from mast 126 to the top of shroud 112. Robotic arm 128 would, of course, have to be relatively short in order to fit and work within the relatively smaller space of annulus 116.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. Apparatus for use in a nuclear reactor, the reactor including a reactor pressure vessel having a top guide spaced from a core plate therein, the top guide and core plate having openings extending therethrough, a shroud extending around the core plate and an annulus formed between the reactor pressure vessel and the shroud, said apparatus comprising:
   an elongate mast, a slot formed in and extending at least partially along the axial length of said mast, said mast comprising an outer cylindrical shaped tube and an inner tube positioned at least partially within said outer tube;
   a robotic arm mounted to said mast and vertically movable relative to said slot, said inner tube connected to said robotic arm and vertically movable relative to said outer tube; and
   a vertical drive assembly for controlling vertical movement of said robotic arm, said vertical drive assembly secured to said mast inner tube, said vertical drive assembly comprising a vertical drive motor and a pinion, rotation of said pinion controlled by said vertical drive motor, an elongate rack secured to and extending longitudinally along a length of said outer tube, said rack aligned with said pinion so that as said pinion rotates, said inner tube moves vertically relative to said outer tube.

2. Apparatus in accordance with claim 1 further comprising a sliding guide secured to said inner tube and extending from said inner tube to the inner surface of said outer tube.

3. Apparatus in accordance with claim 1 further comprising a fixturing component interface secured to a bottom end of said mast, said interface comprising a substantially stationary plate member and thrust bearings secured to an upper surface of said plate member, said mast having alignment arms configured to mate with said thrust bearings so that said mast is rotatable relative to said plate member.

4. Apparatus in accordance with claim 3 wherein said fixturing component interface further comprises a control rod drive housing alignment pin extending from said plate member, said alignment pin configured to be inserted into an opening formed in a top portion of a control rod drive housing.

5. Apparatus in accordance with claim 3 wherein said fixturing component interface further comprises a plurality of fuel casting support alignment pins extending from said plate member, said alignment pins configured to be inserted into respective fuel support casting openings formed in a fuel support casting.

6. Apparatus in accordance with claim 3 further comprising a rotary actuator, a ring gear secured to an outer portion of said mast, a pinion gear coupled to, and controlled by, said rotary actuator and aligned with said ring gear so that as said pinion gear rotates, said ring gear and said mast rotate.

7. Apparatus in accordance with claim 3 further comprising a rotary actuator motor having a rotor coupled to and extending therefrom, a cylindrical rotor housing secured to said mast, said rotor extending through said cylindrical housing and cooperating with said housing so that as said rotor rotates relative to said motor, said cylindrical rotor housing and said mast rotate relative to said motor.

8. Apparatus in accordance with claim 1 further comprising a top guide interface secured to said mast and configured for cooperating with the top guide to restrict lateral movement of said mast.

9. Apparatus in accordance with claim 1 further comprising a core plate interface secured to said mast and configured for cooperating with the core plate to restrict lateral movement of said mast.

10. Apparatus in accordance with claim 1 wherein said mast is sized to be positioned within the annulus.

11. Apparatus in accordance with claim 1 wherein said mast further comprises said inner tube having a substantially square cross sectional shape, a sliding guide secured to said inner tube and extending from said inner tube to the inner surface of said outer tube, a fixturing component interface secured to a bottom end of said mast, said interface comprising a substantially stationary plate member and thrust bearings secured to an upper surface of said plate member, said mast having alignment arms configured to mate with said thrust bearings so that said mast is rotatable relative to said plate member.

12. Apparatus in accordance with claim 1 wherein said robotic arm comprises a hydraulic cylinder having a shoulder joint extending therefrom, an upper arm member coupled at one end to said shoulder joint, an elbow joint coupled to the other end of said upper arm member, a lower arm member coupled to said elbow joint and rotatable about said elbow joint relative to said upper arm.

* * * * *